2,967,162
COATING COMPOSITIONS

Joseph A. Vasta, Darby, Pa., assignor to E. I. du Pont de Nemours and Company, Wilmington, Del., a corporation of Delaware No Drawing. Filed Aug. 25, 1958, Ser. No. 757,108

11 Claims. (Cl. 260—21)

This invention relates to novel polymers and coating compositions and more particularly to liquid coating compositions in which the essential organic film-forming material is a mixture of (1) a novel copolymer, or interpolymer, of styrene, ethyl acrylate and maleic acid half ester, in certain proportions, with (2) an alcohol-modified melamine-formaldehyde condensate, an alcohol-modified urea-formaldehyde condensate, an epoxide resin, an epoxidized vegetable oil, or a mixture thereof.

The invention is especially directed to baking enamels for electrical appliances such as refrigerators, freezers, washing machines and clothes driers, and for related articles such as kitchen cabinets. In this field there is a continuing search for coatings having improved properties, particularly an improved balance of properties which make the coatings unusually serviceable on such articles in the absence of underlying metal-protective prime coats. These properties include hardness, flexibility, adhesion, gloss, durability, and resistance to adverse effects from abrasion (wear), grease, fumes, foods, soaps, detergents, and other chemicals, and in the case of clothes driers, exposure to high temperatures. Simultaneously, useful products of this type, in order to be acceptable to the manufacturer of the finished article must be capable of being applied by conventional methods and of being baked under industrial conditions to yield unblemished coatings; and they must be economical to use in relation to previously adopted coating compositions.

The principal objective of this invention is to provide new interpolymers and coating compositions therefrom having an improved balance of the properties required for the above-mentioned end-uses. Another objective is to provide new interpolymers and coating compositions of the baking type which are generally useful in the baked organic coating art.

The new interpolymers of this invention contain 30–80 mol percent of styrene, 15–65 mol percent of ethyl acrylate and 5–25 mol percent of a half ester of maleic acid and at least one alcohol of the class consisting of primary and secondary monohydric alcohols free of non-benzenoid unsaturation, containing only carbon, hydrogen and oxygen, containing up to 18 carbon atoms and containing hydroxyl as the only functional substituent. They are prepared in such a manner as to be compatible or miscible (admixable in a mutual solvent to yield a homogeneous solution) with urea- or melamine-formaldehyde-alcohol condensates, epoxide resins, and epoxidized vegetable oils of the type commonly used in baking-type coating compositions.

The new coating compositions of this invention are pigmented or clear (unpigmented) liquid coating compositions in which the essential organic film-forming material is a mixture of 30%–95% by weight of a new interpolymer as described above with, complementally (i.e. totalling 100%), 70%–5% by weight of at least one of the following: urea-formaldehyde-alcohol condensates, melamine-formaldehyde-alcohol condensates, epoxide resins and epoxidized vegetable oils, as described hereinafter, the mixture being dissolved in a volatile organic solvent of the general type commonly used in the organic coating art. Well known modifiers such as curing accelerators, grinding aids, surface active agents, waxy substances and plasticizers can be present in their usual small proportions but are not required.

The products of this invention are non-aqueous, to the extent that water is not essential in the processes or products, and any which may enter with the essential ingredients is preferably kept to a minimum.

The new interpolymers (copolymers, or terpolymers) contain carefully selected proportions of styrene, ethyl acrylate, and maleic acid half ester. The styrene content is 30–80 mol percent, i.e. 30–80 mols per 100 mols total of polymerized components. A styrene content substantially less than 30 mol percent tends to yield undesirable levels of hardness, gloss, and water and chemical resistance in the ultimate coatings. Flexibility suffers as the styrene content increases; and, above about 80 mol percent, the ultimate coatings are too inflexible or brittle to be generally useful. At least 15 mol percent of ethyl acrylate is required to plasticize the interpolymer and aid in compatibility with the other film-forming components of the liquid coating composition. Above about 65 mol percent ethyl acrylate, there is no known advantage which compensates for the added cost. At least 5 mol percent maleic acid half ester is required in the interpolymer to yield inertness and insolubility in the ultimate coatings. Above about 25 mol percent maleic acid half ester, undesirably high viscosity, difficulty in reproducibility and sometimes gelation occur in the preparation of the interpolymer, the resulting higher acidity of the liquid coating composition leads toward instability, higher proportions of the other film-formers are required, and the added cost is not offset by further advantages.

The preferred interpolymers contain 40–70 mol percent styrene, 20–50 mol percent ethyl acrylate and 10–20 mol percent maleic acid half ester since the coatings ultimately derived therefrom possess the optimum balance of properties in relation to cost by present standards.

The interpolymers (copolymers, or terpolymers) are prepared in general by a two stage process involving, first, preparing an interpolymer of styrene, ethyl acrylate and maleic anhydride, using the molar proportions defined above, with the amount of maleic anhydride being equivalent on a molar basis to the amount of maleic acid half ester desired in the final interpolymer. Then the resulting interpolymer is treated with a monohydric alcohol, as defined above, under mild esterification conditions whereby the maleic anhydride moiety in the preformed polymer is converted into substantially the corresponding maleic acid half ester.

The starting or first-stage interpolymers are prepared in general by heating a mixture of styrene, ethyl acrylate and maleic anhydride, in the indicated proportions, in the presence of about 25%–400%, based on the weight of said mixture, of an aromatic hydrocarbon solvent for the mixture at a temperature of 125°–200° C. until substantially all of the styrene, ethyl acrylate and maleic anhydride is polymerized. The polymerization is preferably conducted in the presence of a normal amount, e.g. about 0.1%–2% based on the weight of said mixture, of a vinyl polymerization initiator which is effective in the indicated temperature range, for example ditertiarybutyl peroxide, benzaldehyde peroxide, 2,2-bis (tertiarybutylperoxy) butane, tertiarybutyl peracetate, diazoaminobenzene, or cumene hydroperoxide. Conventional polymerization adjuvants such as activators, inhibitors, surface active agents and chain transfer agents can be present but are not required.

The aromatic hydrocarbon solvent can be, for example benzene, toluene, xylene, mixtures containing such materials in major proportions, and petroleum distillate fractions of dominantly aromatic composition, such as those marketed under the trade names Velsicol Concentrate 70, Sinclair #30 Solvent, Amsco Solvent B, Panasol AN-1, Solvesso 100 and Solvesso 150. Although it is most convenient to use a solvent which refluxes at the desired polymerization temperature because this permits operating at atmospheric pressure, solvents having lower atmospheric boiling points can be used in a closed vessel under super-atmospheric pressure. The presence of solvent during polymerization permits close control of temperature, encourages reproducibility from batch to batch and yields a product having a pourable or otherwise easily handled consistency. The preferred amount of solvent present during polymerization is about 33%–100% of the total weight of styrene, ethyl acrylate and maleic anhydride.

The styrene, ethyl acrylate and maleic anhydride are preferably in substantially monomeric form, i.e. as commercial or technical grade monomers. As provided commercially, they usually contain minute amounts of polymerization inhibitors, which can be, but need not be, removed in practicing this invention.

The polymerization temperature range of 125°–200° C. used in preparing the interpolymers of this invention, and a particularly preferred range of about 130°–170° C., are substantially above the temperatures at which vinyl interpolymers are usually made. These higher temperatures yield products having the desired properties in the ultimate coatings and the desired compatibility in the liquid coating compositions. Polymerization temperatures below about 125° C. tend to yield highly viscous polymers which, in turn, yield liquid coating compositions having an undesirably low solids content. Polymerization temperatures above about 200° C. tend to yield watery polymers which, in turn, yield relatively brittle coatings.

The esterification step in preparing the final interpolymers is carried out most conveniently by adding the appropriate alcohol, or a mixture of two or more of such alcohols, to the preformed polymer solution slowly, in increments or in a single addition and heating the mixture, with or without refluxing, at a convenient esterification temperature, for example 100°–200° C. Under these conditions, formation of the half ester proceeds quite rapidly. Formation of the corresponding diester is avoided or minimized by the mild reaction conditions. An excess of the alcohol, i.e. more than the one mol which combines with one mol of anhydride, can be used and is preferred when the presence of unreacted alcohol in the system can be tolerated. Of course, excess alcohol can be removed, for example by fractional distillation; but it is much simpler either to use an alcohol such that an excess can be tolerated or to carefully minimize the amount of an alcohol which is undesirable in its free state in the system.

Examples of suitable alcohols are the 1–18 carbon atom saturated aliphatic monohydric alcohols from methyl to stearyl including alkyl substituted homologs such as 2-ethyl hexyl. Others are the cycloaliphatic monohydric alcohols such as cyclohexyl, methyl cyclohexyl and cyclopentyl. Still others are phenol and substituted phenols such as tertiary butyl phenol, octyl phenol and phenyl phenol.

The preferred interpolymers, substantially freed of the solvent they are prepared in, have relative viscosities in the range of 1.07–1.17 as determined by a procedure fully described hereinafter. The interpolymers in this range are particularly adaptable to liquid coating compositions of the type involved in this invention because (1) their degree of polymerization is sufficient to provide a desirable solids content and viscosity in the liquid coating compositions, a desirable thickness of smooth coating by conventional methods of application, and desirable toughness, durability, film integrity and other physical and chemical properties in the dried coatings, and (2) their degree of polymerization is not sufficient to yield the undesirable or impractical results of gelation, insolubility in common solvents, incompatibility with the other film-forming components of the liquid coating compositions, and uneconomical thin coatings resulting from low solids content at practical application viscosities for the liquid coating compositions.

The epoxidized vegetable oils that are useful in this invention can be purchased on the open market. Examples are "Paraplex" G–60 and G–62 (Rohm and Haas Co.) and "Admex" 710 (Archer-Daniels-Midland Co.). Alternatively they can be prepared, following known processes such as are disclosed in U.S. 2,569,502, by epoxidizing the naturally-occurring (or equivalent synthetic) esters of glycerine (or other polyhydric alcohol, e.g. sorbitol) and the $C_8$–$C_{22}$ vegetable oil acids, of which at least one is unsaturated. Examples of naturally-occurring oils which represent this class are soya oil, linseed oil, dehydrated castor oil, perilla oil, cottonseed oil, etc. Epoxidized soya oil is preferred.

The epoxide resins that are useful in this invention are also available on the open market, for example as "Epon" -828, -1001, -1004, -1007 (Shell Chemical Corp.); "Araldite" -6030, -6071, -6084, -6097 (Ciba Products Corp.); and "Epi-Rez" -510, -520, -530C, -540 (Jones-Dabney Co.). Alternatively they can be prepared by condensing a polyhydric phenol, preferably diphenylol propane, with an epihalohydrin or a polyepoxy compound, preferably epichlorohydrin, in accordance with well known methods, such as those disclosed in U.S. 2,503,726; 2,528,985; 2,592,560 and 2,694,694. The epoxide resins are epoxyhydroxy polyethers, and those containing on the average more than one epoxy group per molecule are preferred.

The urea-formaldehyde-alcohol and melamine-formaldehyde-alcohol condensates, also referred to herein for the sake of brevity as urea and melamine components, which are useful in the coating compositions of this invention are the types commonly used in organic baking enamels. They are prepared by well known methods involving, fundamentally, reacting urea and formaldehyde or a reaction product thereof, e.g. dimethylol urea, or melamine and formaldehyde or a reaction product thereof, e.g. tetra-, penta- or hexamethylol melamine, with a $C_1$ to $C_4$ saturated aliphatic monohydric alcohol, i.e. methanol, ethanol, propanol, or butanol, usually in excess of the amount required to etherify all of the methylol groups. Suitable methods are disclosed in U.S. 2,191,957 and 2,197,357. A wide variety of suitable condensates of these types are readily available in the resin market usually in the form of solutions containing 50%–60% resin (condensate) in a convenient solvent. They are usually described as urea- or melamine-formaldehyde "coating resins" or "resins for finishes," and they are offered by several suppliers under such trade names as "Resimene," "Uformite," "Plaskon," "Beetle," "Melmac" and "Beckamine."

The organic film-forming material in the coating compositions of this invention contains an interpolymer and one or more other film-forming materials as previously described in the proportions of 30%–95% by weight of interpolymer, and, complementally, 70%–5% by weight of urea component, melamine component, epoxidized oil, epoxide resin, or a mixture thereof. The balance of properties of compositions outside these proportions, although suitable for some coating applications, is not what is usually required of enamels for the previously described end-uses or for other baking enamel uses. A preferred range of proportions, especially for electrical appliance enamels, is 60%–90% of interpolymer and, complementally, 40%–10% of other film-forming component.

Although some improvement in a particular property of a baking enamel may be obtained using ingredients, proportions and procedures generally like but slightly outside the limits specified herein with respect to the organic film-forming components, operation within these limits is important if the optimum improvement is to be obtained. In this sense and to this extent, these limits are critical.

The pigments and solvents which are useful in the coating compositions of this invention are the kinds commonly used in organic paints, varnishes, enamels and lacquers, and they are used in the usual proportions employed in the organic coating art.

Examples of suitable pigments are metal oxides, hydroxides, chromates, silicates, sulfides, sulfates and carbonates, carbon blacks, organic dyestuffs and likes thereof and metal flake pigments like aluminum. Since the interpolymers contain free carboxyl groups, acid-sensitive and strongly basic reacting pigments are preferably avoided. The amount of pigment is not critical. It usually is within the range of 1%–200% by weight of the total organic film-forming material present.

Suitable solvents, and diluents which can be used in admixture with solvents, include aromatic and aliphatic hydrocarbons, alcohols, ketones and esters. Mixtures of aromatic hydrocarbons, such as xylene, and aliphatic monohydric alcohols, such as butanol, are preferred. The solvent or solvent mixture, and any diluent which may be used, must be volatile to the extent that it evaporates readily from a wet coating during the subsequent baking (drying) step and leaves a dry coating. The amount of solvent, plus diluent if used, is not critical. It usually is within the range of 10%–85% of the total coating composition.

The coating compositions of this invention can be applied by any conventional method such as spraying, brushing, dipping, flowing or roller coating. Spraying is preferred. The coatings are baked by conventional methods to harden and insolubilize them and to develop the improved properties to an optimum degree. Baking times and temperatures are not critical but, in order to obtain the best results, the widely used commercial baking schedules are preferred. These range from 45–60 minutes at about 250° F. to 10–20 minutes at about 400° F. The optimum range is usually from 25–30 minutes at about 280° F. to 15–20 minutes at 350° F.

The following examples are provided to illustrate the principles and practice of this invention, but its scope is not limited to the exact details of these illustrative examples. Unless otherwise indicated, the parts and percentages are given by weight.

EXAMPLE 1

*Preparation of interpolymer 51.3% styrene/35.6% ethyl acrylate/13.1% 2-ethyl hexyl acid maleate (molar basis)*

| | Parts by wt. |
|---|---|
| Aromatic hydrocarbon, boiling range 150°–190° C. aniline point—28° C. ("Solvesso" 100) | 2021 |
| Styrene, commercial grade monomer | 2474 |
| Ethyl acrylate, commercial grade monomer | 1649 |
| Maleic anhydride, commercial grade monomer | 590 |
| Ditertiarybutyl peroxide | 49 |
| 2-ethyl hexanol | 1568 |
| Xylol, boiling range 135°–146° C., aniline point—44° C. | 1649 |

The aromatic hydrocarbon is charged into a reaction vessel equipped with a thermometer, agitator and reflux condenser and is heated to about 140° C. The styrene, ethyl acrylate, maleic anhydride and ditertiarybutyl peroxide are mixed well at room temperature, and the mixture is introduced into the vessel in a slow stream during a period of 3 hours at such a rate that the reaction temperature is held at 140°–145° C. After the last of the mixture has been added, the charge is held in this temperature range for about 2 hours. The 2-ethyl hexanol is then added while maintaining the temperature at 130°–140° C., and the mixture is then heated for another 2 hours at 135°–145° C. Heating is discontinued, and the xylene is added. The resulting solution of interpolymer contains about 55.5% solids by weight and has a Gardner-Holdt viscosity of Z-4. The interpolymer has a relative viscosity of 1.120 as determined in accordance with the following procedure.

Relative viscosity is determined first by spreading about 2–3 cc. of interpolymer solution over an area of about 3 square inches in an aluminum foil dish. Interpolymer substantially free of solvent is obtained by heating the thus-prepared sample dish in an oven at about 120° C. for 3 hours. From the resulting dry interpolymer, a solution is made containing 500 mg. of polymer in 50 ml. of ethylene dichloride. The efflux time of this solution is measured at 25° C. in accordance with ASTMD-445-53T using the solution as the "oil" in said ASTM determination. A Cannon-Fenske (modified Ostwald) viscosimeter for transparent liquids, series or size number 100, is used in accordance with Appendix A of the determination. The efflux time of a sample of the ethylene dichloride used in making said solution is likewise determined. Relative viscosity, $N_r$, of the interpolymer is calculated from the equation:

$$N_r = \frac{\text{efflux time of polymer solution}}{\text{efflux time of ethylene dichloride}}$$

*Preparation of enamel*

First portion: Parts by wt.
| | |
|---|---|
| Titanium dioxide pigment | 2,667 |
| Butanol | 700 |
| Aromatic hydrocarbon ("Solvesso" 100) | 109 |
| Interpolymer solution as prepared above | 969 |

Second portion:
| | |
|---|---|
| Interpolymer solution as prepared above | 3,879 |
| Epoxidized soya oil ("Paraplex" G-62) | 333 |
| Epoxide resin, epoxide equivalent approx. 190, liquid ("Epon" 828) | 333 |
| Butanol | 209 |
| Isopropanol | 800 |

The organic film-forming materials in this enamel are present in the proportions of 80:20 interpolymer:total epoxide components, or 80:10:10 interpolymer:epoxidized oil:epoxide resin.

The enamel is prepared by grinding the ingredients of the first portion by the sand grinding process of U.S. Patent 2,581,414 until a smooth uniform dispersion is obtained and then admixing therewith the ingredients of the second portion.

The resulting enamel is particularly useful as a "one-coat" topcoat for unprimed refrigerator cabinets. It is tested for this use by thinning 4 pints of the enamel to spraying consistency by admixing therewith 1 pint of toluene containing 4.5 grams of octadecyltrimethylammonium acid phthalate baking accelerator. The resulting thinned enamel is sprayed in an industrial manner on "Bonderite"-treated steel refrigerator cabinet panels in such an amount as to yield complete and continuous coatings having a dry thickness of about 1.5 mils. The thus coated panels are then baked for 30 minutes at 300° F. After cooling to room temperature, the enamel on these panels is tested in comparison with a representative commercially-used "one-coat" refrigerator enamel based on a mixture of alkyd resin, urea-formaldehyde-alcohol condensate and melamine-formaldehyde-alcohol condensate. The new enamel of this example is superior in hardness, abrasion resistance and resistance to discoloration and/or deterioration from grease, alkaline soaps and detergents, foods, kitchen fumes and heat. The new enamel is substantially equal to the prior art enamel in appearance, flexibility, impact resistance and protective properties in salt-spray and high temperature/high humidity tests.

EXAMPLES 2, 3, 4, 5

Four enamels which are particularly useful as "one-coat" topcoats for refrigerator, clothes washer or drier cabinets are prepared, first, by grinding the following components in conventional paint grinding apparatus until a smooth uniform dispersion is obtained:

| | Parts by wt. |
|---|---|
| Titanium dioxide pigment | 600 |
| Butanol | 158 |
| Aromatic hydrocarbon ("Solvesso" 100) | 25 |
| Interpolymer solution of Example 1 | 218 |

The resulting dispersion is converted into enamel in accordance with the following formulas by admixing the remaining components:

| | Ex. 2 | Ex. 3 | Ex. 4 | Ex. 5 |
|---|---|---|---|---|
| Dispersion prepared directly above | 445 | 445 | 445 | 445 |
| Interpolymer solution of Example 1 | 418 | 418 | 443 | 418 |
| Epoxidized soya oil as in Example 1 | | 17 | | |
| Epoxide resin as in Example 1 | 50 | 33 | 33 | |
| Epoxide resin, epoxide equivalent approx. 490, melting point about 70° C. Durran mercury method ("Epon" 1001) | | | | 50 |
| Toluene | | | | 25 |
| Butanol | | | | 25 |
| Proportions: | | | | |
| Interpolymer | 85 | 85 | 90 | 85 |
| Epoxy component | 15 | 15 | 10 | 15 |
| Oil | | (5) | | |
| Resin | (15) | (10) | (10) | (15) |

The resulting enamels are thinned for spraying by admixing with 4 pints of enamel, 1 pint of toluene containing 4.0 grams of cetyl dimethyl amine baking accelerator. Each enamel is sprayed on several steel panels ("Parkerized") in such an amount as to yield complete and continuous coatings having a dry thickness of about 1.5 mils. The thus coated panels are then baked for 30 minutes at 300° F.

The properties of the resulting coatings are excellent and are substantially the same as those of the product of Example 1 except for having slightly less flexibility.

EXAMPLE 6

*Preparation of interpolymer 66.5% styrene/20.5% ethyl acrylate/13% butyl acid maleate (molar basis)*

| | Parts by wt. |
|---|---|
| Aromatic hydrocarbon, boiling range 189°–219° C., aniline point—28° C. ("Solvesso" 150) | 3000 |
| Styrene | 4725 |
| Ethyl acrylate | 1400 |
| Maleic anhydride | 875 |
| Cumene hydroperoxide | 70 |
| Butanol | 266 |
| Xylol | 120 |

The aromatic hydrocarbon is charged into a reaction vessel equipped with a thermometer, agitator and reflux condenser and is heated to 190° C. The styrene, ethyl acrylate, maleic anhydride, and cumene hydroperoxide are mixed well at room temperature, and the mixture is introduced into the vessel in a slow stream during a period of 2 hours at such a rate that the reaction temperature progressively decreases from 190° to the range of 150°–155° C. where it is held for about 1 hour after the last of the mixture has been added. The butanol is then added slowly over a half-hour period. The charge is then held at about 130° C. for 1 hour. Heating is discontinued, the charge is cooled to a temperature below 135° C., and the xylol is mixed in. The resulting solution of interpolymer contains about 55% solids by weight. The interpolymer has a relative viscosity of about 1.09.

The resulting solution is converted into a clear coating composition by mixing it with epoxide components in accordance with the following formula:

| | Parts by wt. |
|---|---|
| Interpolymer solution of this example | 524 |
| Epoxidized soya oil-dehydrated castor oil mixture | 27 |
| Epoxide resin, epoxide equivalent approx. 1800, melting point about 130° C. Durran mercury method ("Epon" 1007) | 24 |
| Proportions: | |
| Interpolymer | 85 |
| Epoxy component | 15 |
| Oil | (8) |
| Resin | (7) |

The thus prepared clear coating composition is applied to clean polished chrome plate, aluminum and brass by thinning with xylol for application by dipping and, after application, baking the coated articles for 30 minutes at about 400° F. Clear, glossy, smooth, adherent coatings are obtained, and these coatings have excellent resistance to discoloration and deterioration when exposed to grease, food kitchen fumes, soap and heat.

The utility of the composition defined in the formula immediately above is not limited to clear coatings since it can be pigmented with conventional pigments in the usual proportions and in the usual manner. Likewise the clear, unpigmented coatings of this invention are not limited to the particular interpolymer or other film-forming components used in this example or to the specific proportions employed in this example. Clear coating compositions of this invention can be prepared by employing the various interpolymers and other film-forming components in the proportions previously defined, without pigment.

The following three examples (7–9) provide additional interpolymers of this invention which can be used on an equal weight basis as substitutes for the corresponding interpolymers in the foregoing examples or in other coating compositions in the proportions set forth herein.

EXAMPLE 7

*Preparation of interpolymer 51.5% styrene/35.5% ethyl acrylate/13% decyl acid maleate (molar basis)*

| | Parts by wt. |
|---|---|
| Aromatic hydrocarbon, boiling range 150°–190° C., aniline point—28° C. | 250 |
| Xylene (in reaction mixture) | 250 |
| Styrene | 612 |
| Ethyl acrylate | 408 |
| Maleic anhydride | 146 |
| Ditertiarybutyl peroxide | 12 |
| Decyl alcohol | 250 |
| Xylene (final addition) | 637 |

The interpolymer solution is prepared as in Example 1 with the exception that decyl alcohol is substituted for 2-ethyl hexanol.

EXAMPLE 8

*Preparation of interpolymer 51.3% styrene/35.6% ethyl acrylate/13.1% tridecyl acid maleate (molar basis)*

| | Parts by wt. |
|---|---|
| Aromatic hydrocarbon, boiling range 150°–190° C., aniline point—28° C. | 250 |
| Xylene (in reaction mixture) | 250 |
| Styrene | 612 |
| Ethyl acrylate | 408 |
| Maleic anhydride | 146 |
| Ditertiarybutyl peroxide | 12 |
| Tridecyl alcohol | 357 |
| Xylene (final addition) | 628 |

The interpolymer solution is prepared as in Example 1 except that tridecyl alcohol is substituted for 2-ethyl hexanol.

EXAMPLE 9

*Interpolymer 37.4% styrene/45.4% ethyl acrylate/ 17.2% 2-ethyl hexyl acid maleate (molar basis)*

| | Parts by wt. |
|---|---|
| Xylene (first portion) | 381 |
| Styrene | 245 |
| Ethyl acrylate | 245 |
| Maleic anhydride | 90 |
| 2-ethyl hexanol | 239 |
| Xylene (second portion) | 192 |

The interpolymer solution is prepared by heating the first four ingredients for 1.5 hours at 170°–180° C. under autogenous pressure in a closed vessel equipped with a thermometer and an agitator. The reaction mixture is cooled to about 100° C., the vessel is opened, the remaining two ingredients are added, the vessel is closed, and the esterification is carried out at 145°–150° C. for about 1 hour under autogenous pressure.

EXAMPLE 10

*Preparation of interpolymer 39.5% styrene/55.2% ethyl acrylate/5.3% (p-tertiarybutyl phenyl) acid maleate (molar basis)*

| | Parts by wt. |
|---|---|
| Aromatic hydrocarbon, boiling range 158°–208° C., aniline point—5° C. (Sinclair #30 Solvent) | 288 |
| Styrene | 272 |
| Ethyl acrylate | 365 |
| Maleic anhydride | 34 |
| Ditertiarybutyl peroxide | 7 |
| p-Tertiarybutyl phenol | 52 |
| Methyl isobutyl ketone | 297 |

The interpolymer solution is prepared by the procedure of Example 1 except that the phenol is substituted for 2-ethyl hexanol and that the charge is then heated for three hours at 160°–165° C. The resulting solution contains about 55% solids.

Preparation of primer

| First portion: | Parts by wt. |
|---|---|
| Titanium dioxide | 250 |
| Barytes, micronized pigment grade | 250 |
| Butanol | 67 |
| Xylene | 67 |
| Interpolymer solution of this example | 180 |
| Second portion: | |
| Interpolymer solution of this example | 184 |
| Urea - formaldehyde - butanol condensate, 60% solids in butanol | 500 |
| Xylene | 103 |

The organic film-forming materials in this enamel are present in the proportions of 40:60 interpolymer:urea condensate.

The primer composition is prepared by grinding the components of the first portion in conventional paint grinding apparatus and admixing the components of the second portion with the resulting smooth dispersion.

The resulting liquid coating composition is useful mainly as a primer or first coat on metal cabinets for electrical appliances. It is tested for this use by thinning to spraying consistency with a mixture of xylene and butanol (4:1), spraying on steel cabinet panels to a coating thickness of about 0.7 mil (measured dry) and baking for 30 minutes at 400° F. Upon cooling, the thus-primed panels are topcoated with the product of Example 1 applied and baked as directed therein, except that a dry coating thickness of about 1 ml. is used instead of 1.5 mils. In comparison with conventional primer-topcoat appliance finishing systems using urea-formaldehyde-butanol condensate/alkyd resin coatings, the new system of this example is equal or superior in all important properties, i. e. those masured in Example 1.

EXAMPLE 11

*Interpolymer 75.1% styrene/16.2% ethyl acrylate/8.7% stearyl acid maleate (molar basis)*

| | Parts by wt. |
|---|---|
| Aromatic hydrocarbon ("Solvesso" 100) | 430 |
| Styrene | 781 |
| Ethyl acryate | 162 |
| Maleic anhydride | 85 |
| Cumene hydroperoxide | 11 |
| Stearyl alcohol | 234 |
| Xylene | 592 |

The aromatic hydrocarbon is charged into a reaction vessel equipped with a thermometer, agitator and reflux condenser and is heated to 150°–155° C. The styrene, ethyl acrylate, maleic anhydride and cumene hydroperoxide are mixed well at room temperature, and the mixture is introduced into the vessel in a slow stream during a period of 3.5 hours at such a rate that the reaction temperature is held between 150° and 155° C. After the last of the mixture has been added, the charge is held at about 150° C. for about one hour when heating is discontinued. The stearyl alcohol is then added slowly while maintaining the temperature at 140°–150° C., and the mixture is heated for another 2 hours at about 150° C. Heating is discontinued and the xylene is added. The resulting solution contains about 55% solids.

An enamel having the following formula is prepared by the procedure dscribed in Example 10.

| First portion: | Parts by wt. |
|---|---|
| Titanium dioxide | 900 |
| Butanol | 149 |
| Xylene | 149 |
| Interpolymer solution of this example | 409 |
| Second portion: | |
| Interpolymer solution of this example | 861 |
| Melamine - formaldehyde - butanol condensate, 50% solids in 5:1 butanol:xylene | 400 |
| Melamine-formaldehyde - methanol condensate, 60% solids in 7:7 toluene:butanol | 167 |
| Xylene | 132 |
| Proportions of film-formers: | |
| Interpolymer | 70 |
| Melamine component | 30 |
| Butanol condensate | (20) |
| Methanol condensate | (10) |

When thinned to spraying consistency with xylene, sprayed on steel panels in a conventional manner and baked for 20 minutes at 350° F., the enamel of this example yields coatings having properties substantially equal to the products of Example 1.

EXAMPLE 12

*Interpolymer 61.4% styrene/18.3% ethyl acrylate/20.3% cyclohexyl acid maleate (molar basis)*

| | Parts by wt. |
|---|---|
| Aromatic hydrocarbon ("Solvesso" 100) | 428 |
| Styrene | 639 |
| Ethyl acrylate | 183 |
| Maleic anhydride | 203 |
| Ditertiarybutyl peroxide | 11 |
| Cyclohexanol | 198 |
| Xylene | 562 |

The interpolymer solution is prepared as in Example 1 except that cyclohexanol is substituted for 2-ethyl hexanol.

An enamel having the following formula is prepared by the procedure described in Example 10.

| First portion: | Parts by wt. |
|---|---|
| Titanium dioxide | 800 |
| Butanol | 132 |
| Xylene | 132 |
| Interpolymer solution of this example | 364 |

Second portion:

| | |
|---|---|
| Interpolymer solution of this example | 1181 |
| Melamine - formaldehyde - butanol condensate, 50% solids in 5:1 butanol:toluene | 100 |
| Urea-formaldehyde-butanol condensate 60% solids in butanol | 166 |
| Xylene | 125 |
| Proportions of film-formers: | |
| Interpolymer | 85 |
| Melamine component | 5 |
| Urea component | 10 |

When thinned to spraying consistency with a mixture of toluene and isopropanol (3:1), sprayed on steel panels in a conventional manner, and baked for 30 minutes at 300° F., the enamel of this example yields coatings having properties substantially equal to the product of Example 1.

The foregoing examples have been given for clearness of understanding only, and no unnecessary limitations of the invention are to be interpreted therefrom. Obvious modifications will appear to persons skilled in the interpolymer and organic coating arts. The invention is not intended to be limited except as defined in the appended claims.

I claim:

1. An interpolymer of 30–80 mol percent of styrene, 15–65 mol percent of ethyl acrylate and 5–25 mol percent of a half ester of maleic acid and at least one alcohol of the class consisting of primary and secondary monohydric alcohols free of non-benzenoid unsaturation, containing only carbon, hydrogen and oxygen, containing up to 18 carbon atoms and containing hydroxyl as the only functional substituent, prepared by (1) heating a mixture of styrene, ethyl acrylate and maleic anhydride within said molar proportions in solution in about 25%–400%, based on the weight of said mixture, of aromatic hydrocarbon solvent for said mixture at a temperature of 125°–200° C. until substantially all of said styrene, ethyl acrylate and maleic anhydride is polymerized, and (2) converting the maleic anhydride in the resulting polymer to said half ester by esterification with said alcohol.

2. An interpolymer of claim 1 in which the styrene, ethyl acrylate and maleic acid half ester are present in the proportions of 40–70 mol percent of styrene, 20–50 mol percent of ethyl acrylate and 10–20 mol percent of maleic acid half ester.

3. An interpolymer of claim 1 in which styrene, ethyl acrylate and 2-ethyl hexyl acid maleate are present in the proportions of about 51.3 mol percent of styrene, 35.6 mol percent of ethyl acrylate and 13.1 mol percent of 2-ethyl hexyl acid maleate.

4. An interpolymer of claim 1 prepared in solution in said aromatic hydrocarbon solvent in the amount of about 33%–100% based on the weight of said mixture.

5. An interpolymer of claim 1 prepared at temperatures within the range of about 130°–170° C.

6. An interpolymer of claim 1 in which the polymerization step 1 is carried out in the presence of a vinyl polymerization initiator.

7. A liquid coating composition comprising, as the essential organic film-forming material, a compatible mixture of (1) 30%–95% by weight of an interpolymer of claim 1 and (2) 70%–5% of at least one member of the class consisting of melamine-formaldehyde-monohydric alcohol condensates, urea-formaldehyde-monohydric alcohol condensates, epoxyhydroxypolyether resins, and epoxidized vegetable oils; said film-forming material being in solution in volatile organic solvent therefor.

8. A coating composition of claim 7 in which (1) and (2) are present in the proportions of 60%–90% and 40%–10% respectively.

9. A coating composition of claim 7 further containing pigment.

10. A liquid coating composition consisting essentially of pigment and a mixture of about 80%–90% by weight of an interpolymer of claim 1, 0%–10% by weight of epoxidized vegetable oil and 10%–15% by weight of epoxyhydroxy polyether resin, said mixture being in solution in volatile organic solvent therefor.

11. A liquid coating composition consisting essentially of pigment and a mixture of about 40%–85% by weight of an interpolymer of claim 1 and 60%–15% by weight of at least one member of the class consisting of melamine-formaldehyde-monohydric alcohol condensates and urea-formaldehyde-monohydric alcohol condensates, said mixture being in solution in volatile organic solvent therefor.

References Cited in the file of this patent

UNITED STATES PATENTS

| | | |
|---|---|---|
| 2,047,398 | Voss et al. | July 14, 1936 |
| 2,499,653 | Kropa | Mar. 7, 1950 |
| 2,519,764 | Jacobson | Aug. 22, 1950 |
| 2,537,016 | Barrett | Jan. 9, 1951 |
| 2,675,370 | Barrett | Apr. 13, 1954 |
| 2,798,062 | Contois | July 2, 1957 |
| 2,848,433 | Eirich | Aug. 19, 1958 |